April 2, 1935.　　　　W. KARIUS　　　　1,996,474
SAUSAGE APPARATUS
Filed Sept. 9, 1933　　　3 Sheets-Sheet 1
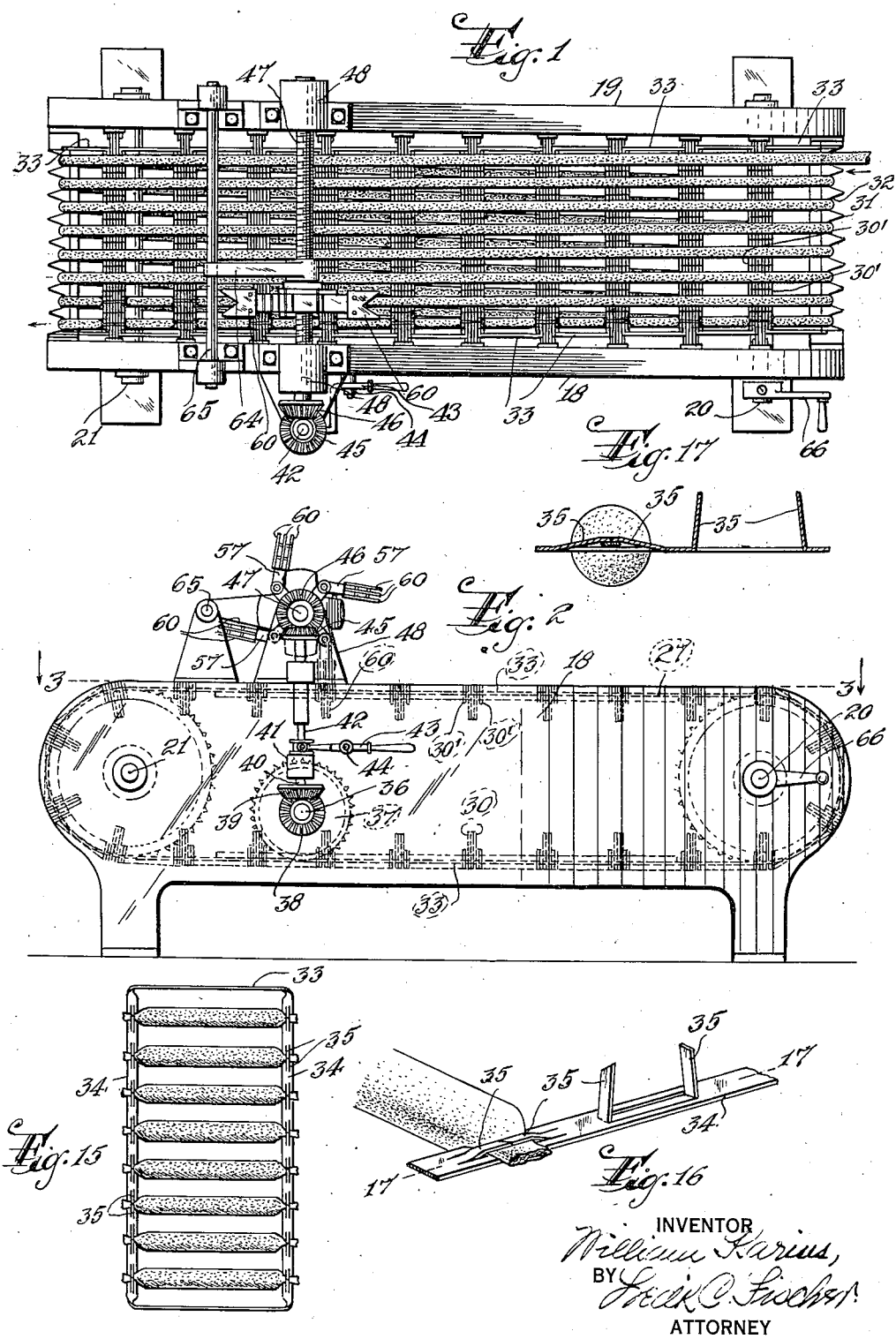

April 2, 1935.   W. KARIUS   1,996,474
SAUSAGE APPARATUS
Filed Sept. 9, 1933   3 Sheets-Sheet 2
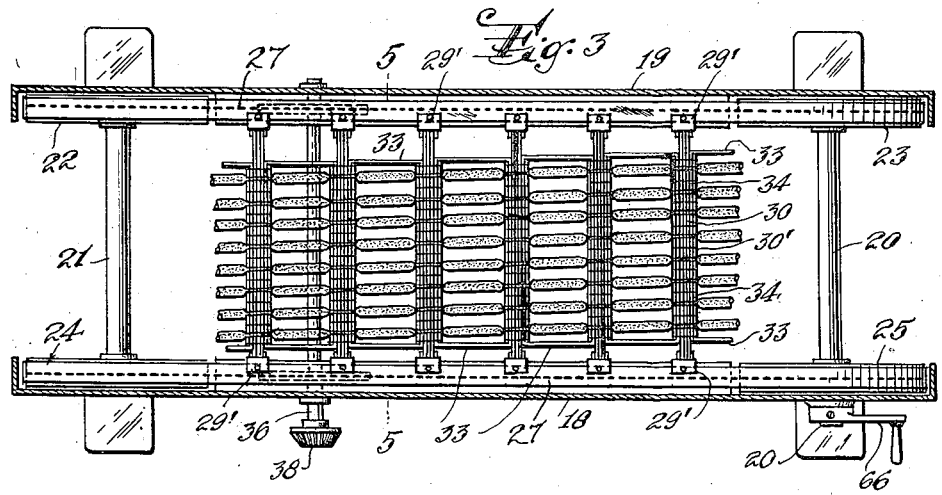
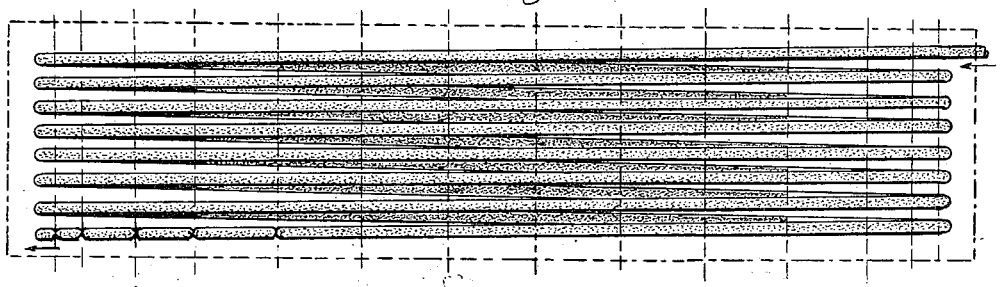
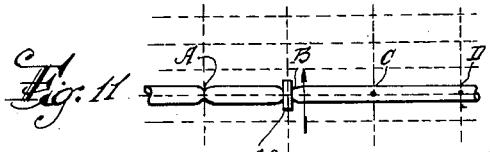
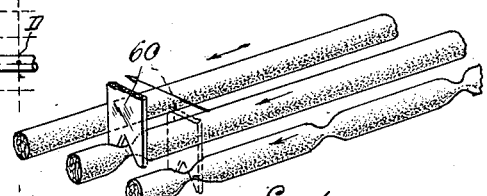
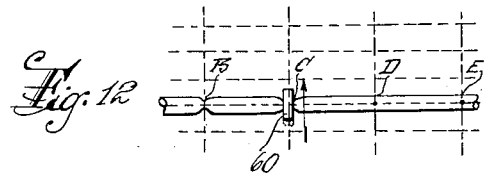
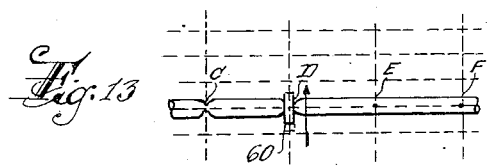
INVENTOR
William Karius,
BY
ATTORNEY April 2, 1935.  W. KARIUS  1,996,474
SAUSAGE APPARATUS
Filed Sept. 9, 1933    3 Sheets-Sheet 3
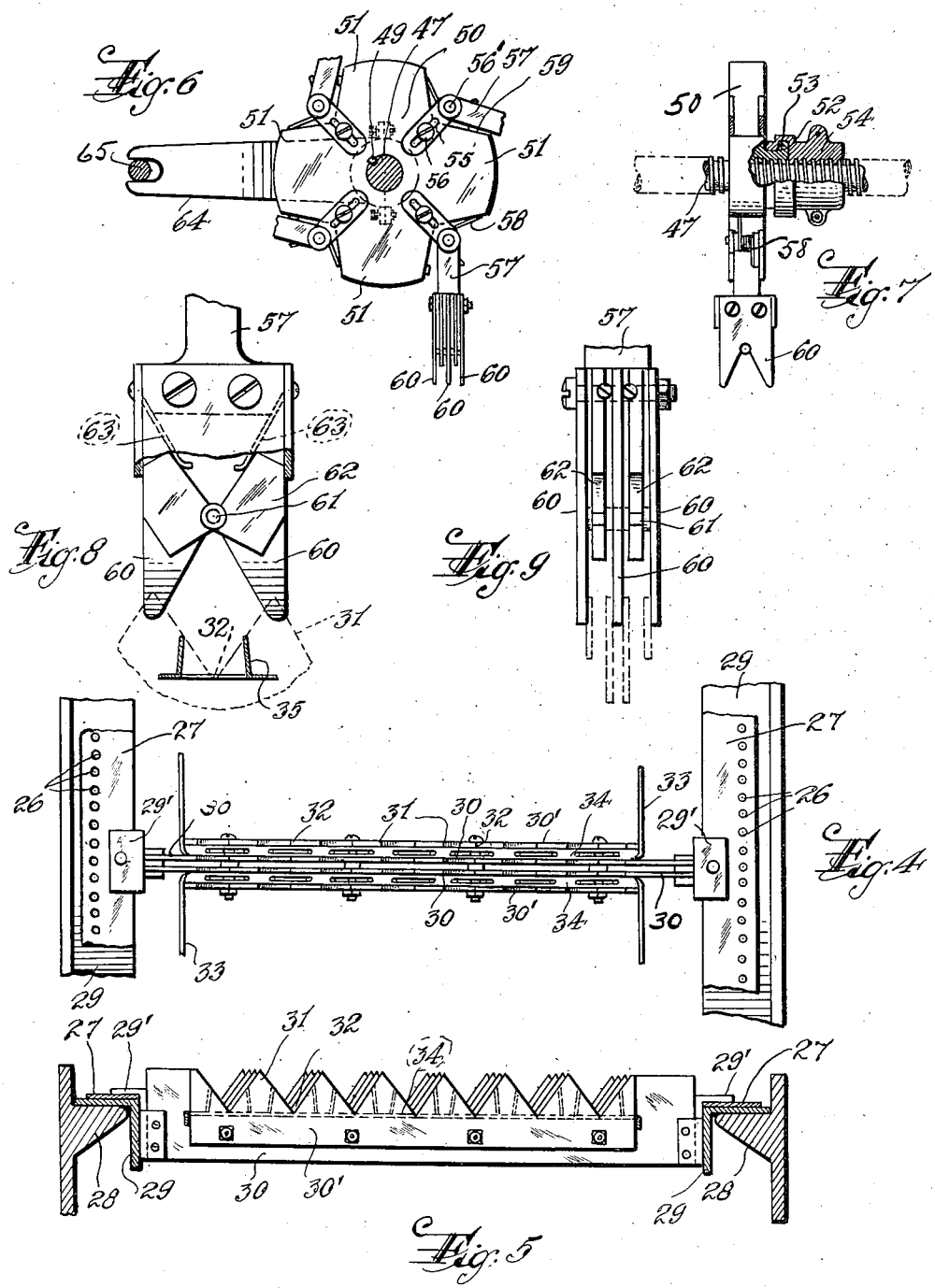
INVENTOR
William Karius,
BY
ATTORNEY Patented Apr. 2, 1935

1,996,474

UNITED STATES PATENT OFFICE 1,996,474

SAUSAGE APPARATUS

William Karius, Newark, N. J.

Application September 9, 1933, Serial No. 688,790

7 Claims. (Cl. 17—34)

This invention relates to an apparatus for automatically forming sausages into a desired length and weight, and arranging the sausages in a definite manner for packing and shipping, without necessitating the touching of the sausages by human hands at any time.

Heretofore, sausages have generally been made in large plants mostly by hand, automatic linking machines being used in some instances. After the linking operation, the sausages have been put on smoke sticks to be smoked and cooked. This method necessitates frequent touching of the sausages by human hands; and the sheep or hog gut casings, or the artificial casings sometimes used, often break while the sausages are being linked or twisted. Also, the sausages get white spots on the casings whenever the sausages contact; or when they are hanging over smoke sticks and parts of the sausages contact they stick and are not cooked, thus causing white spots on sausages. When packed in bundles of five or ten pounds for shipping, the sausages press against each other, and become moist and greasy. Also, in many stores the exposed sausages are handled by the customers, which is very unsanitary.

It is an object of this invention to provide an apparatus by means of which sausages are automatically pressed into a desired length and weight, and fastened to frames in spaced relation, so that they will not touch each other. In my apparatus, the sausages are not linked or twisted; and the breaking of casings is reduced to a minimum regardless of the type of casing used.

A further object is the provision of an apparatus for automatically forming and attaching sausages to a frame, without necessitating the touching of the sausages at any time by human hands. The frames may be designed to hold any number of sausages, it being found desirable to provide a frame for holding about a pound of sausages, that is, about eight sausages spaced apart so that they will not touch each other. The present type of smoke sticks are not used; but a special type of smoke stick is employed upon which the frames are attached while the sausages are being cooked and smoked, thereby eliminating the possibility of white spots on the sausages. When the sausages are ready for packing, the frame carrying the sausages is preferably placed in a bag of transparent cellulose material or similar material and sealed. At no time is it necessary to handle the sausages directly; only the frames are handled.

A further object is the provision of a novel frame for holding a plurality of sausages in spaced relation.

These and other advantageous objects which will later appear, are accomplished by the simple and practical construction and arrangement of parts hereinafter described and exhibited in the accompanying drawings, in which:

Fig. 1 is a plan view of the sausage forming apparatus,

Fig. 2 is a side elevational view of the apparatus,

Fig. 3 is a view taken on line 3—3 of Fig. 2,

Fig. 4 is an enlarged plan view of a section of the apparatus,

Fig. 5 is a view taken on line 5—5 of Fig. 3,

Fig. 6 is a side elevational view of a sausage pressing and clamping device forming a part of the apparatus, Fig. 7 is a front elevational view of an element of the pressing and clamping device, Fig. 8 is an enlarged view showing details of the element shown in Fig. 7.

Fig. 9 is a side view of the element shown in Fig. 8,

Fig. 10 is a diagrammatic view showing the spiral arrangement of the sausage on the apparatus, Figs. 11, 12 and 13 are diagrammatic views showing the manner in which sausages in a line are progressively pressed and clamped to a frame, Fig. 14 is a perspective view indicating a step in the pressing of the ends of a sausage, Fig. 15 is a plan view of a sausage holding frame forming an essential element of the apparatus, Fig. 16 is an enlarged view of a side of the frame, showing in detail the manner in which a sausage is clamped to the frame, and Fig. 17 is a sectional view taken on line 17—17 of Fig. 16.

Referring to the drawings, my apparatus is shown to comprise a frame having side walls 18 and 19 in the ends of which are journalled shafts 20 and 21 having attached thereto respectively sprocket wheels 23, 25, and 22, 24. Passing over the sprocket wheels are endless belts 27 having apertures 26, see Fig. 4, through which pass the sprockets of the wheels. The belts rest upon brackets 28 attached to the sides 18 and 19, and attached to the side walls are angles 29 over which pass the belts 27, to which are attached angles 29'. Each pair of opposite angles 29' supports a pair of parallel plates 30, to which are bolted the plates 30', each of said plates having a plurality of upstanding triangular teeth 31 to provide triangular grooves 32 as shown in Fig. 5.

Referring to Fig. 1 it will be seen that my apparatus comprises a plurality of units of plates as above described. That is, each unit has four vertical plates 30 and 30' spaced from each other, and each plate has triangular teeth 31, the triangular teeth of each plate being directly in line with the teeth of the other plates of that particular unit.

However, the plurality of units are progressively offset with relation to each other as is indicated in Fig. 1, so that the teeth of one unit will project slightly into the space between the teeth of the next unit and so on as is indicated in Fig. 5. It will be seen that this arrangement provides a substantially spiral groove extending the length of the machine so that when a continuous chain or rope of sausage is introduced into the machine, it will have a spiral shape, as indicated in Fig. 10.

Referring to Fig. 15, there is shown a frame 33 in which sausages are held. The frame 33 is substantially rectangular in shape, and is preferably made of a relatively thin strip of bendable metal. The longitudinal sides 34 of the frame are horizontal while the short sides 33 are vertical, enabling the frame to be made from a strip of material simply by twisting the sides alternately, horizontally and vertically. The longitudinal sides 34 have struck up therefrom a plurality of prongs 35 arranged in pairs, and spaced so that a sausage will fit between each pair of prongs. The prongs are bendable to firmly clamp the ends of a sausage to a frame as indicated in Fig. 16.

A plurality of frames 33 are mounted upon my apparatus in the manner indicated in Fig. 4; that is, the longitudinal side 34 of one frame is placed between two of the plates 30 and 30' of one unit, and the longitudinal side 34 of another frame is placed between the other two plates 30 and 30' of the same unit. The frames are arranged upon the units so that the pairs of prongs 35 embrace the grooves 32 as indicated in Figs. 5 and 8. As the rope or chain of sausage is fed into the machine, it passes through the grooves 32 and between the prongs 35 as indicated in Figs. 1, 5 and 8.

Journalled in the side walls 18 and 19 near one end of the machine is a shaft 36 having fixed thereto a sprocket wheel 37 the teeth of which engage the holes 26 in the chains 27, the shaft having also fixed thereto a bevelled gear 38 in mesh with the bevelled gear 39, which is fixed to a vertical shaft 40, the latter being connected to a second vertical shaft 42 by means of a clutch 41 which is controlled by a lever 43 pivoted to the side wall 18 at 44. Fixed to the upper end of the shaft 42 is a bevelled gear 45 in mesh with the bevelled gear 46 fixed to a horizontal shaft 47 which is threaded throughout its length and journalled in bearings 48 mounted on the side walls 18 and 19.

Slidably connected to the shaft 47 by means of a spline 49 is a member 50 having four projections 51, as shown in Fig. 6. Projecting from the member 51 is a collar surrounding the shaft 47 and having a flange 52 which is positioned in a groove 53 in a nut 54 threadedly mounted on the shaft 47. As the shaft 47 is rotated, the nut 54 moves longitudinally thereof and carries with it the member 50, the latter rotating also with the shaft 47.

Four slotted links 55 are adjustably mounted on the member 50 by means of screws 56, the links being radially arranged with reference to the shaft 47, and positioned between adjacent projections 51. Pivoted at 56' to each link 55 is a link 57 which is normally held by means of a coiled spring 58, against a lug 59 on an adjacent projection 51. Attached to the extremity of link 57 are three small plates 60 parallel to and spaced from each other as shown in Fig. 6, each plate 60 having a triangular groove.

Mounted between adjacent plates 60 and pivoted on a pin 61 are pairs of blocks 62, see Fig. 8, which are normally urged to rotate downwardly in opposite directions by flat springs 63.

Integral with the nut 54 is an arm 64 which engages a rod 65 and prevents rotation of the nut with the screw shaft 47.

The apparatus is operated by means of a hand crank 66 attached to the shaft 20.

In operation, a plurality of frames 33 are mounted on the units of plates 30 and 30' as above described and indicated in Fig. 3. It will be noted that due to the progressive offsetting of the units of plates 30 and 30' the frames 33 will be offset from each other as shown in Fig. 3.

The rope of sausage is fed into the apparatus through the grooves 32 in plates 30 and 30', and due to the offset relation of the plates in the several units, the rope of sausage will have a spiral form as shown in Fig. 10. The chain of sausages is started on the machine by attaching one end of the chain to a frame at one side of the machine; for example, at the point shown by the lowermost arrow in Fig. 10, the machine moving in the direction indicated by the arrow. As the machine continues to rotate, the chain of sausages is held and guided into the spiral grooves resulting from the offset arrangement of prongs as indicated in Fig. 5, the chain of sausages ending at the uppermost arrow shown in Fig. 10. As the crank 66 is rotated to wind the rope of sausage on the apparatus, the shaft 47 will be rotated to rotate the member 50; and as the member 50 is rotated, one of the links 57 will be periodically brought to a vertical position as shown in Fig. 6; so that the three small plates 60 will lie between the outermost plates 30' of each unit and between the two inner plates 30 thereof. As the member 50 rotates, and the link 57 descends, the outermost plate 60 will engage the ends of sausages in a line in adjacent frames and press the ends of the sausages between the prongs 35 projecting up from the longitudinal sides 34 of the frames 33. Continued descent of link 57 causes the blocks 62 to engage the prongs 35 and the blocks 62 to assume a position such that their lower edges are substantially in line against the action of spring 63. Further descent of the link 57 causes the blocks 62 to press the prongs 35 over the ends of the sausage as is indicated in Fig. 16. As the unit travels on, the link 57 moves therewith and gradually becomes disengaged from the plates 30 and 30' thereof, after which the link is immediately moved by the coiled spring 58 against the lug 59 upon an adjacent projection 51.

It will be seen that the member 50 must travel along the shaft 47 in order to be in line with a set of grooves in a unit of plates 30 and 30' the travelling of the member 50 being necessary due to the offsetting of the units of plates 30 and 30'.

After the member 50 has moved throughout the length of the shaft 47, the clutch 41 is disengaged, and the member 50 is moved back to its initial position to repeat the series of operations, the movement of the member 50 being enabled by reason that the nut 54 is split, and capable of being expanded so that it can be freely moved without interference from the threads on shaft 47.

From the above description it will be seen that I have provided an apparatus for automatically forming sausages to a desired length, and for fixing the sausages in spaced relation upon frames.

After the sausages have been fixed to the frames as above described, the frames can be mounted upon a suitable rack to enable the sausages to be cooked and smoked. By means of this arrangement, during the cooking and smoking, there are no parts of the sausages which contact each other or contact smoke sticks, and thus is eliminated the possibility of white spots and green sausage. After the sausages have been cooked and smoked they can be inserted into a bag of transparent cellulose material or similar material and delivered to the ultimate consumer in that manner.

The foregoing disclosure is to be regarded as descriptive and illustrative only, and not as restrictive or limitative of the invention, of which obviously an embodiment may be constructed including many modifications, without departing from the general scope herein indicated and denoted in the appended claims.

Having thus described my invention, what I claim as new and desire to secure by Letters Patent, is:

1. A device for holding a plurality of sausages in spaced relation, comprising a substantially rectangular frame having a central opening and a plurality of prongs projecting upwardly from the longitudinal sides thereof, said prongs being bendable to clamp the ends of sausages to the frame.

2. A device for holding a plurality of sausages in spaced relation, comprising an open polygonal frame of strip material having a plurality of prongs projecting upwardly therefrom, said prongs being bendable to clamp the ends of sausages to the frame.

3. In an apparatus for forming and arranging sausages in a desired relation, comprising a plurality of units of vertical plates, each of said plates having upwardly projecting triangular teeth, the triangular teeth of the plates of each unit being progressively offset with relation to the teeth of plates in adjacent units so as to present a substantially spiral groove extending the length of the apparatus, a plurality of frames mounted on the units, said frames having bendable prongs projecting therefrom, and means to bend said prongs to clamp the ends of sausages to the frames.

4. In a sausage forming machine, a plurality of units of spaced parallel plates, each unit having four plates with upstanding triangular teeth to present triangular grooves, and a plurality of sausage holding frames mounted on the units so that one side of a frame will rest between a pair of plates of a unit and one side of another frame will rest between the other pair of plates of the same unit, the sides of said frames having means thereon to enable sausages to be clamped to the frame.

5. In a sausage forming machine, a forming unit comprising four spaced parallel plates having upstanding triangular teeth to present triangular grooves, a rectangular frame having one of its longitudinal sides positioned between a pair of said plates, said longitudinal side having a plurality of pairs of upstanding prongs, each pair of said prongs having a triangular groove therebetween, a vertical link, means to move the link upwardly and downwardly, three spaced parallel plates attached to the lower end of the link, said plates having triangular grooves in the lower edges thereof, pairs of blocks pivotally mounted between the plates on the link, and spring means to normally maintain the blocks in a predetermined position, said blocks being adapted to pass between the plates of the unit so that the pivotally mounted blocks will engage and depress the prongs on the frame as the link descends.

6. In a sausage forming apparatus, a frame having one side provided with a plurality of upstanding prongs, a vertically movable member having a pair of blocks pivotally mounted thereon, and resilient means to normally urge the blocks to rotate downwardly towards each other, said blocks engaging and depressing a pair of prongs on the frame as the member descends.

7. In a sausage forming apparatus, a plurality of forming and guiding units arranged so that a rope of sausage thereon will have substantially a spiral form, a plurality of frames supported by said units, said frames having upstanding prongs between which a sausage is positioned, a threaded shaft positioned above and transversely to the direction of movement of said units, a nut threaded on said shaft, a member splined to the shaft and rotatably connected to said nut to move therewith, a plurality of links pivotally mounted on said member, each of said links having a vertical downward movement periodically as said member rotates, each link having a pair of blocks pivotally mounted at the extremity thereof, and resilient means to normally urge said blocks to rotate downwardly toward each other, said blocks engaging and depressing a pair of said prongs during the downward descent of the link.

WILLIAM KARIUS.